No. 884,469. PATENTED APR. 14, 1908.
W. COX.
COMBINED ANTIRATTLER THILL COUPLING AND SUPPORT.
APPLICATION FILED MAR. 20, 1907.

Inventor
Walter Cox

Witnesses

By Henry N. Copp
his Attorney

UNITED STATES PATENT OFFICE.

WALTER COX, OF PROVO, UTAH.

COMBINED ANTIRATTLER THILL COUPLING AND SUPPORT.

No. 884,469.  Specification of Letters Patent.  Patented April 14, 1908.

Application filed March 20, 1907. Serial No. 363,453.

*To all whom it may concern:*

Be it known that I, WALTER COX, a citizen of the United States, residing at Provo city, county of Utah, and State of Utah, have invented certain new and useful Improvements in Antirattler Thill Couplings and Supports, of which the following is a specification.

This invention relates to anti-rattler thill couplings and supports.

The object of the present invention is the provision of a novel thill coupling and support having means whereby the thills may be readily detached when desired and also provided with an improved device for automatically locking the thill when it is raised above its ordinary position, thus facilitating hitching of the horse as well as providing means for holding the thill out of the way when it is desired to have it thus positioned.

Another object is to provide a thill coupling and support of novel construction which will be provided with novel means for taking up all lost motion and thus preventing rattling.

In carrying out the invention I employ certain improved features of construction and novel arrangements and adaptations of parts all of which are set forth fully hereinafter and recited in the appended claims.

Figure 1:
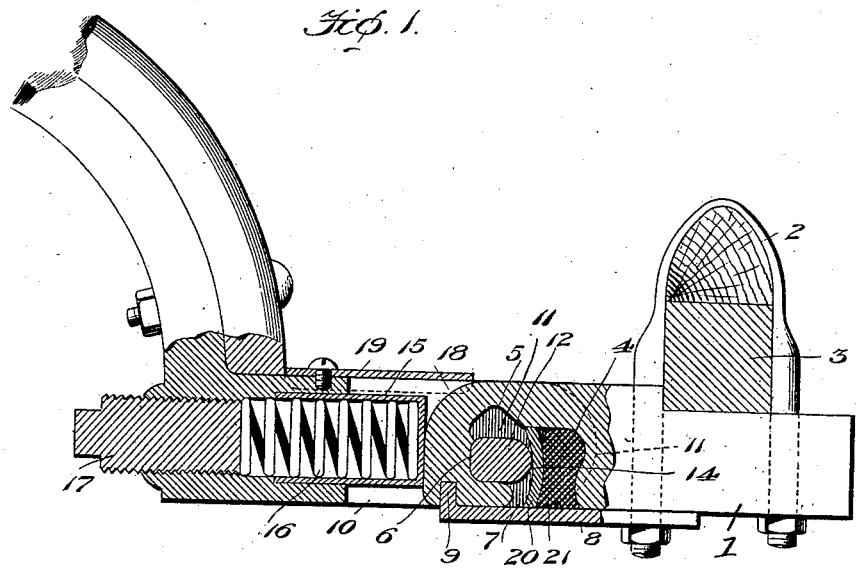
Figure 2:
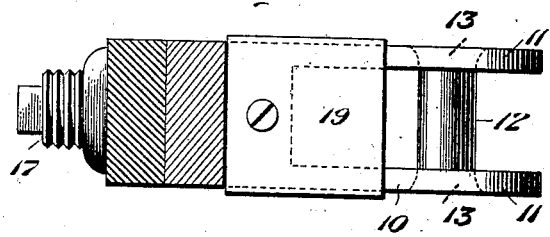
Figure 3:
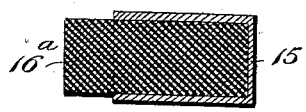

In the accompanying drawings: Figure 1 is a side view, largely in section, of the invention; Fig. 2 is a detail plan view of the thill coupling member, showing the thill and thill iron in section; and Fig. 3 is a sectional view showing a modified form of rubber spring.

The numeral 1 designates the part of the coupling which is secured by the usual U-shaped clevis or yoke 2 to the axle 3. This coupling member 1 is provided with a transverse opening which has three off-sets 4, 5 and 6, and an entrance mouth 7, the latter being closed by a removable plate 8 held by one of the legs of yoke 2 and provided with an up-turned end 9 entering a notch in the coupling member 1.

The thill coupling member 10 is provided with a fork 11 having a coupling-pin 12 which extends transversely thereof and has its ends swaged or expanded at 13, thus firmly securing it. This coupling-pin 12 is of general elliptical form in cross-section, but by preference more rounded at 14 at its rear side than at its forward side. The coupling-pin 12 is of slightly less width, along its minor axis than the width of the neck 7 so that it may be readily passed through said neck 7 in attaching or detaching the parts of the thill coupling.

Slidable within a chamber in the thill member 10 is a cup 15, in which is a coil spring 16. As indicated in Fig. 3, a rubber spring 16ª may be substituted for the spring 16. Threaded through the forward end of the thill member 10 is an adjusting or tension screw 17 whose flat inner end bears against the spring 16.

The forward end of the coupling member 1 is flat but the upper part of this forward end is rounded at 18. The bottom of the cup 15 bears against the flat forward end of the coupling member 1 when the parts of the coupling are in normal position, but when the thill member 10 is raised, the cup bears against the rounded part 18.

A detachable plate 19, carried by the member 10, covers the joint of members 1 and 10 and excludes dust and dirt.

The numeral 20 designates an abutment which has a curved face conforming to the curvature 14 of the pin 12, and back of this abutment is a rubber cushion 21, which is adapted to be crowded into the off-set 4. The abutment and cushion 21 are entirely separate and independent pieces and are loosely positioned in the slot or opening of the coupling member 1.

When the parts of the coupling are in normal position, the pin 12 lies in the off-set 6, being held there by the spring 16 and having its abutment on the abutment 20, backed by cushion 21, and the thill member itself is enabled to rock slightly owing to the movement of the animal, without dislocating the parts. When, however, it is desired to support the thill in raised position, the thill is lifted sufficiently for the pin 12 to clear the off-set 6 and it then snaps into the locking off-set 5, still bearing against the abutment 20, which is shifted by the expansion of the cushion 21 to accommodate itself to the new position of the pin 12. The thill and coupling 10 are then locked in the raised position. A slight downward fall will bring the parts to normal position. Whichever position the parts are in, that position is maintained, principally by the spring 16, but is also assisted by the cushion 21.

Any desired tension may be placed upon the spring 16 by adjusting the screw 17. To entirely detach the thill member 10 from member 1, the nut holding the plate 8 is removed and the plate taken off. The tension of the spring 16, being lessened by unscrewing the screw 17, the abutment 20 and cushion 21 can be removed through neck 7 and the pin 12 then made to pass through said neck.

Having thus described my invention, what I claim as new and desire to secure by Letters Patent, is:—

1. In a thill coupling and support, the combination with a thill coupling member having a recess provided with a coupling-pin bearing and a locking notch, of a cushioned abutment located in said recess, another thill coupling member having a coupling-pin received in the recess and bearing against the abutment and normally received in the coupling-pin bearing aforesaid, said parts being so disposed that when the thill coupling member last-named is raised the coupling-pin is shifted into the locking notch, and spring means carried by the last-named thill coupling member and bearing against the first-named thill coupling member.

2. In a thill coupling and support, the combination with a hook-shaped thill coupling member having a coupling-pin bearing and a separate locking notch, of another thill coupling member composed of side pieces adapted to straddle the hook-shaped coupling member and having a coupling-pin connecting said side pieces and normally received in the coupling-pin bearing aforesaid, said parts being so disposed that when the thill coupling member last named is raised the coupling-pin is shifted into the locking notch and held thereby, and spring means for holding the coupling-pin in its bearing or locking notch.

In testimony whereof, I hereunto affix my signature in presence of two witnesses.

WALTER COX.

Witnesses:
ALFRED L. BOOTH,
HARVEY CLUFF.